United States Patent [19]

Willis et al.

[11] Patent Number: 4,482,667

[45] Date of Patent: Nov. 13, 1984

[54] MODIFIED POLYALKYLENEPOLYAMINES

[75] Inventors: Stephen B. Willis, Lake Jackson; Pamela J. Boyce, Angleton, both of Tex.

[73] Assignee: The Dow Chemical Company, Midland, Mich.

[21] Appl. No.: 586,374

[22] Filed: Mar. 5, 1984

Related U.S. Application Data

[63] Continuation-in-part of Ser. No. 548,475, Nov. 3, 1983.

[51] Int. Cl.$^3$ ............................................. C08G 59/00
[52] U.S. Cl. .................................... 523/400; 528/405; 528/422
[58] Field of Search ................. 523/400; 528/405, 422

[56] References Cited

U.S. PATENT DOCUMENTS

| | | | |
|---|---|---|---|
| 3,210,308 | 10/1965 | Garms | 524/812 |
| 3,247,048 | 4/1966 | Gaertner | 162/164 |
| 3,491,049 | 1/1970 | Gibson et al. | 523/130 |
| 3,511,314 | 5/1970 | Scott et al. | 166/293 |
| 3,988,279 | 10/1976 | Klassen | 106/90 |
| 4,129,528 | 12/1978 | Petrovich et al. | 528/405 |
| 4,131,578 | 12/1978 | Crinkelmeyer et al. | 106/89 |
| 4,191,820 | 3/1980 | Langdon | 528/405 |
| 4,260,700 | 4/1981 | Cassutt et al. | 523/400 |
| 4,316,003 | 2/1982 | Dante et al. | 528/407 |
| 4,328,142 | 5/1982 | Hertel et al. | 523/417 |

FOREIGN PATENT DOCUMENTS

1125486  8/1968  United Kingdom ................ 528/405

Primary Examiner—Ronald W. Griffin
Attorney, Agent, or Firm—J. G. Carter

[57] ABSTRACT

Modified polyalkylenepolyamine compositions are prepared which are useful as fluid loss additives.

4 Claims, No Drawings

MODIFIED POLYALKYLENEPOLYAMINES

CROSS REFERENCE TO RELATED APPLICATION

This application is a continuation-in-part of application Ser. No. 458,475 filed Nov. 3, 1983.

BACKGROUND OF THE INVENTION

The present invention concerns modified polyalkylenepolyamine compositions suitable for use in aqueous hydraulic cement slurry compositions.

Hydraulic cements, i.e., any inorganic cement that hardens or sets under water, are customarily admixed with water and emplaced as aqueous slurries. The amount of water employed may vary rather extensively dependently largely upon the fluidity of the slurry required and upon the necessary ultimate strength. In a great many uses of a hydraulic cement it is necessary for the cement slurry to be emplaced within or next to a porous medium, for example, earthen strata, e.g., in the cementing off of boreholes, grouting, dam and tunnel construction and the like. When such is the case water filters out of the slurry and into the strata during the setting period. When this occurs to any appreciable extent there usually results an uncontrolled setting rate, improper placement, impaired strength properties and usually a contamination of the surrounding strata. All of these undesirable conditions are especially to be avoided in cementing operations associated with oil, gas, water or brine wells. In an effort to lessen the loss of fluid from an aqueous hydraulic cement slurry various materials have been employed. One such material comprises a polyamine compound selected from the class consisting of polyalkylenimines, polyalkylenepolyamines and mixtures thereof. A description of these polyamine compounds and their use in hydraulic cement slurries is taught, for example, in U.S. Pat. No. 3,491,049, the teachings of which are specifically incorporated herein by reference. Although these polyamino compounds are quite satisfactory in environments wherein the temperature of the hydraulic cement slurry does not increase to above about 200° F., the fluid loss characteristics of these cement slurries are unacceptable at higher temperatures.

U.S. Pat. No. 4,131,578 discloses fluid loss additive compositions suitable for use at temperatures of 200° F. and above.

The present invention provides a composition suitable for use as fluid loss additives which are more efficient, i.e. they require less active additive to achieve the same level of water loss or at the same level of active additive less water loss occurs while also providing more stable, non-settling, cement slurries.

SUMMARY OF THE INVENTION

The present invention pertains to a modified alkylenediamine or polyalkylenepolyamine composition comprising the product resulting from reacting (A) at least one composition prepared by reacting
  (1) a alkylenediamine or polyalkylenepolyamine composition having an average molecular weight of from about 60 to about 500, preferably from about 150 to about 300 with
  (2) at least one alkylene dihalide with
(B) at least one of
  (1) an epihalohydrin or dihalohydrin,
  (2) an adduct of
    (a) an epihalohydrin or dihalohydrin and
    (b) an alkylenediamine, polyalkylenepolyamine having an average molecular weight of from about 60 to about 500, preferably from about 100 to about 300 or mixtures thereof or
  (3) mixtures thereof; and wherein
(C) component (A-1) and (A-2) are reacted in quantities such that the quantity of A-2 used is less than the amount needed to form a gel by an amount (expressed as weight of carbon and hydrogen contained in A-2) of from about 0.8% to about 5% of the weight of carbon plus hydrogen plus nitrogen present in the reaction mixture when a gel would be formed;
(D) components (A) and (B) are employed in quantities which provide a polyamine which gives a fluid loss of less than 60 ml, preferably less than about 45 according to the API RP 10B fluid loss test described in the examples.

The viscosity of a solution containing 35% active material is usually from about 300 to about 10000, preferably from about 2000 to about 4000 cps.

In determining the amount of the polyalkylenepolyamine and alkylene dihalide to employ, a series of lab scale reactions are employed with varying ratios of reactants of alkylene dichloride:polyalkylenepolyamine such as, for example, 0.4:1, 0.5:1, 0.6:1, 0.8:1 and 1.1:1 by weight are conducted at a suitable temperature and water concentration. From the lowest ratio that created the gel new proportions are selected in the following manner, assuming a ratio of 0.55:1 produced a gel.

The quantity of reactants to be employed can be calculated as follows:

Assume the following formulation produces a gel.

| |
|---|
| 1100 g EDC (ethylene dichloride) |
| 2000 g polyamine |
| 3900 g water |
| 7000 | grams active (carbon, hydrogen, nitrogen) contained in above formulation

| |
|---|
| 2000 from polyamine |
| 311 from EDC |
| 2311 |

The amount of carbon plus hydrogen to leave out of the recipe is from about 19 g to 115 g which corresponds to 67 to 406 grams of EDC.

The amount of crosslinking agent to be further added is determined by adding small portions of crosslinking agent to about 100 grams of the first product until the product gels. At that point (assume 6 grams of 50% active crosslinking agent produced the gel) a series of samples are prepared using 6 g/100 g, 5 g/100 g, 4 g/100 g, etc. The ratio which gives a product with a viscosity of 1000–4000, preferably 2000–3000, cps is the one which would be used to complete the reaction.

DETAILED DESCRIPTION OF THE INVENTION

Suitable polyalkylenepolyamines which can be employed herein include polyethylenepolyamines having an average molecular weight of from about 60 to about 500 which can be prepared by reacting a vicinal alkylene dihalide having from 2 to about 6 carbon atoms with ammonia or lower polyalkylenediamines such as, for example, ethylenediamine, diethylenetetramine and the like. Suitable methods of preparation are disclosed by Garms et al in U.S. Pat. No. 3,210,308 which is incorporated herein by reference. Particularly suitable are the bottoms product from the prepartion of ethylenediamine from ammonia and ethylene dichloride. By bottoms product it is meant that which results after substantially removing those compounds boiling lower than pentaethylenehexamine from the reaction product resulting from reacting ammonia with ethylene dichloride.

Suitable epihalohydrins and/or dihalohydrins which can be employed herein include those represented by the formulas

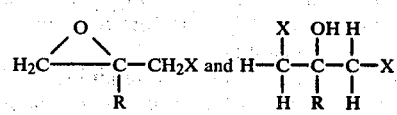

wherein each R is hydrogen or an alkyl group having from 1 to about 4 carbon atoms and each X is independently chlorine or bromine.

The cement slurry also contains an effective amount of a surfactant such as, for example, a water dispersable lignosulfate, lignoamine, sulfonic acids, mixtures thereof and the like.

If desired the cement slurry compositions may also contain a borate ion releasing compound and/or a carbonate and/or a bicarbonate as disclosed by Crinkelmeyer et al in U.S. Pat. No. 4,131,578 which is incorporated herein by reference.

The quantities of components of the aqueous cement slurry composition of the present invention are based on 100 parts by weight of hydraulic cement as follows:
hydraulic cement—100
water—about 25 to about 100, preferably about 35 to about 50
fluid loss additive—about 0.5 to about 8, preferably about 0.75 to about 3
surfactant—about 0.25 to about 5, preferably about 0.5 to about 1.5
borate ion releasing compound—0 to about 3, preferably about 1 to about 2
carbonate or bicarbonate—0 to about 3, preferably 0.1 to about 0.3

The following examples are illustrative of the invention but are not to be construed as to limiting the scope thereof in any manner.

EXAMPLE 1

A. Preparation of Polyalkylenepolyamine

Water, 2200.4 g and 1289 grams of a polyalkylenepolyamine which was the bottoms product resulting from removing tetraethylene pentamine and lower boiling products from the reaction product of ammonia and ethylene dichloride and having an average molecular weight of about 300 and hereafter referred to as polyamine 300 were mixed in a 5-liter flask. Ethylene dichloride (510.5 g) was added to the flask. The mixture of reactants was stirred and heated at 70° C. for 16 hours (57600 s). The viscosity of the resultant solution was <300 cps.

B. Preparation of Crosslinker

Diethylenetriamine, 82.54 g, and 176 g of water were placed in a 1-liter flask. The temperature of the solution was controlled at about 40° C. while 370.14 g of epichlorohydrin was added. The reactants were stirred overnight at 40° C. and a light yellow product was removed from the flask and refrigerated.

C. Preparation of Crosslinked Polymer

Crosslinker solution prepared in B above, 134 g, was added to 4000 g of the polyalkylenepolyamine prepared in A above. The mixture of reactants was heated at 60°–70° C. for 4 hours (14400 s). An amber solution with a viscosity of about 300 cps was removed from the flask. This material was tested as indicated in D below. The results are reported in Table I.

D. Fluid Loss Testing

The fluid loss tests were run according to API RP 10B using a Baroid high temperature high pressure fluid loss apparatus and a 325 mesh (U.S. Standard Sieve Series) stainless steel screen. Lone Star type H cement, 100 parts by weight, was mixed with 0.5 pbw of a surfactant material which is the condensation product of formaldehyde and mononaphthalenesulfonic acid. Water, 42 pbw, was mixed with the desired amount of the active polyamine (1.1% by weight of the cement employed). The water and cement were then blended together and digested at 200° F. (93.3° C.) for 20 minutes (1200 s). The slurry was added to the filtration cell which was preheated to 200° F. (93.3° C.) and the fluid loss, cc in 30 min. (1800 s), was measured with 1000 psig (6.89 kPa) nitrogen pressure on the filtration cell. The fluid loss measure was then multiplied by 2 so as to adjust for the size of the screen used with the filtration cell.

EXAMPLE 2

A. Preparation of Crosslinker

Polyamine 300, 503.5 g, and 825.5 g of water were placed in a 1-liter flask. The temperature of the solution was controlled at 30° C. while 1858 g of epichlorohydrin was added. The reactants were stirred at 70° C. overnight and an amber product was removed from the flask.

B. Preparation of Crosslinked Polymer

Crosslinker solution prepared in A above, 10.3 g was added to 150 g of polyalkylenepolyamine prepared as in Example 1-A. The mixture of reactants was heated at 60°–70° C. for 4 hours (14400 s). An amber solution was removed from the flask. It was tested as a fluid loss additive by the procedure described in Example 1-D. The results are given in Table I.

EXAMPLE 3

To 300 g of polyalkylenepolyamine prepared in Example 1-A was added 8 g of epichlorohydrin. The mixture was reacted in a 60° C. shaker both overnight. An amber solution was produced. This material was tested according to Example 1-D. The results are given in Table I.

EXAMPLE 4

To 250 g of Polyamine 300 was added 640 g of water. Epichlorohydrin, 127 g was added and reacted there-with until the viscosity increased to >3000 cps. The resultant product was tested as a fluid loss additive according to the procedure of Example 1-D. The results are given in Table I.

EXAMPLE 5 (COMPARATIVE)

Example 4 was repeated employing 1200 g of Polyamine 300 and 618 g of ethylene dichloride. The resultant viscosity was >6000 cps. The product was tested as a fluid loss additive employing the procedure of Example 1-D. The results are given in Table I.

TABLE I

| EXAMPLE NO. | FLUID LOSS IN CUBIC CENTIMETERS* |
|---|---|
| 1-A | >60 mls in <5 min. |
| 1-C | 20 |
| 2-B | 20 |
| 3 | 26 |
| 4 | 26 |
| 5 | 70.4 |

*corrected to API standard screen, i.e. the test results have been multiplied by 2.

We claim:

1. A modified alkylenediamine or polyalkylenepolyamine composition comprising the product resulting from reacting
   (A) at least one composition prepared by reacting
      (1) a alkylenediamine or polyalkylenepolyamine composition having an average molecular weight of from about 60 to about 500 with
      (2) at least one alkylene dihalide with
   (B) at least one of
      (1) an epihalohydrin or dihalohydrin,
      (2) an adduct of
         (a) an epihalohydrin or dihalohydrin and
         (b) an alkylenediamine, polyalkylenepolyamine having an average molecular weight of from about 60 to about 500 or mixture thereof or
      (3) mixture thereof; and wherein
   (C) component (A-1) and component (A-2) are reacted in quantities such that the quantity of A-2 used is less than the amount needed to form a gel by an amount (expressed as weight of carbon and hydrogen contained in A-2) of from about 0.8% to about 5% of the weight of carbon plus hydrogen plus nitrogen present in the reaction mixture when a gel would be formed;
   (D) components (A) and (B) are employed in quantities which provide a polyamine which gives a fluid loss of less than 60 ml, according to the API RP 10B fluid loss test described in the examples.

2. A polyalkylenepolyamine composition of claim 1 wherein
   (i) component (A-1) has an average molecular weight of from about 150 to about 350;
   (ii) component (A-2) is ethylene dichloride;
   (iii) components (B-1) and (B-2-a) are epichlorohydrin;
   (iv) component (B-2-b) has an average molecular weight of from about 60 to about 150;
   (v) components (A) and (B) are employed in quantities which provide a polyamine which gives a fluid loss of less than about 45 ml according to the API RP 10B fluid loss test described in the examples and the viscosity of a solution containing 35% active material is from about 2000 to about 4000 cps.

3. A composition of claim 1 wherein the viscosity of a solution containing 35% active material is from about 300 to about 10000 cps.

4. A composition of claim 2 wherein the viscosity of a solution containing 35% active material is from about 300 to about 10000 cps.

* * * * *